G. A. HILDEBRAND.
HORSE-DETACHER.

No. 191,284. Patented May 29, 1877.

Attest:
Alex Scott
F. B. Groff

Inventor:
G. A. Hildebrand

UNITED STATES PATENT OFFICE.

GEORGE A. HILDEBRAND, OF ASHEVILLE, NORTH CAROLINA, ASSIGNOR TO THOMAS D. CARTER, OF SAME PLACE.

IMPROVEMENT IN HORSE-DETACHERS.

Specification forming part of Letters Patent No. 191,284, dated May 29, 1877; application filed March 12, 1877.

To all whom it may concern:

Be it known that I, GEORGE ARTHUR HILDEBRAND, of Asheville, in the county of Buncombe and State of North Carolina, have invented a new and useful Improvement in Whiffletrees, which improvement is fully set forth in the following specification and accompanying drawing.

The object of my invention is to construct a whiffletree (accompanied by suitable shaft attachments) so as to adapt it for detaching horses instantly from vehicles in case of runaway or accident, thereby obviating the danger of demolishing the vehicle, and endangering the lives of its occupants.

Figure 1:
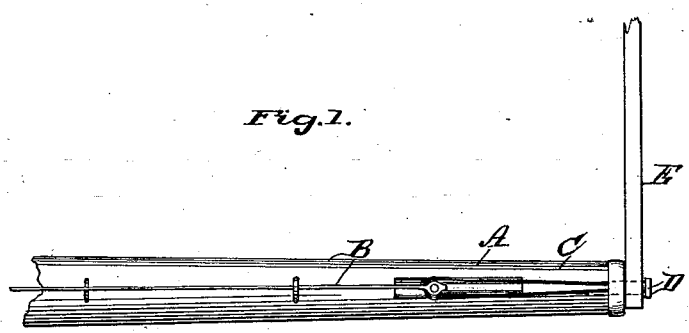
Figure 2:
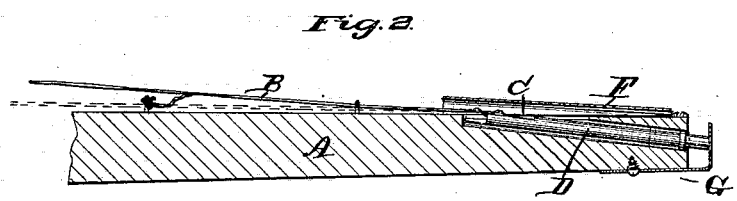

Referring to the drawing, Figure 1 is a plan view of the whiffletree with guard-plate removed, showing the trace attached, and the device for releasing it. Fig. 2 is a vertical longitudinal section of the same.

A is the whiffletree, which is provided at each end with an inclined recess to receive the draft-bar D. This bar has a vertical pin on its inner end, and a rubber spring or band, E, is secured over this pin and under the ring or ferrule on the end of the whiffletree, and serves to hold the bar in engagement with the trace, through a hole in the end of the latter. An L-shaped metal guard, G, is also secured on each end of the tree, having its free end toward the top thereof, to prevent the trace from slipping off the end of the bar. A strap or cord, B, is attached to the pin on each of the draw-bars, and is of sufficient length to be held by the occupant or occupants of the vehicle. A guard-plate, F, covers the recess containing the bar and rubber band or spring to protect it from injury.

To operate the device it is only necessary to pull the cord B, when the draw-bolts are released from the traces, and the animal is at once detached from the vehicle, and all danger to the vehicle or its occupants is entirely avoided.

I am aware that horse-detachers have heretofore been made consisting of draw-bolts placed in recesses in whiffletrees, and actuated by spiral springs, and I therefore lay no claim to such construction, broadly; but What I do claim is—

In a whiffletree, the combination of the draw-bars D, contained in suitable recesses in the end of the tree, the rubber band C, the guard or band C, the guard or cover F, and the L-shaped piece G, all constructed and adapted to operate in connection with the traces, in the manner and for the purpose specified.

G. A. HILDEBRAND.

Witnesses:
PINKNY ROLLINS,
B. H. WEST.